US012394102B2

(12) United States Patent
Huang et al.

(10) Patent No.: US 12,394,102 B2
(45) Date of Patent: Aug. 19, 2025

(54) MESH PARAMETERIZATION WITH TEMPORALLY CORRELATED UV ATLASES

(71) Applicant: TENCENT AMERICA LLC, Palo Alto, CA (US)

(72) Inventors: Chao Huang, Palo Alto, CA (US); Xiaozhong Xu, Palo Alto, CA (US); Jun Tian, Palo Alto, CA (US); Xiang Zhang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 330 days.

(21) Appl. No.: 18/185,033

(22) Filed: Mar. 16, 2023

(65) Prior Publication Data
US 2023/0306648 A1  Sep. 28, 2023

Related U.S. Application Data

(60) Provisional application No. 63/323,885, filed on Mar. 25, 2022.

(51) Int. Cl.
*G06T 9/00* (2006.01)
*G06T 11/00* (2006.01)
(Continued)

(52) U.S. Cl.
CPC ............ *G06T 9/001* (2013.01); *G06T 11/001* (2013.01); *G06T 15/04* (2013.01); *G06T 17/20* (2013.01); *G06T 17/205* (2013.01)

(58) Field of Classification Search
CPC ......... G06T 17/20; G06T 15/04; G06T 15/20; G06T 15/005; G06T 9/001; G06T 17/00;
(Continued)

(56) References Cited

U.S. PATENT DOCUMENTS

2014/0333621 A1   11/2014  Hillesland et al.
2017/0278293 A1    9/2017  Hsu
(Continued)

OTHER PUBLICATIONS

Kun Zhou, et al., "Iso-charts: Stretch-driven Mesh Parameterization using Spectral Analysis", Eurographics Symposium on Geometry Processing, 2004, pp. 1-10.
(Continued)

*Primary Examiner* — Xiao M Wu
*Assistant Examiner* — Scott E Sonners
(74) *Attorney, Agent, or Firm* — Sughrue Mion, PLLC

(57) ABSTRACT

Method, apparatus, and system for generating temporally correlated UV atlases are provided. The process may include generating plurality of consistent UV charts based on partition information associated with one or more previous frames; removing one or more non-manifold vertices from the plurality of consistent UV charts based on assigning one or more incident faces associated with the one or more non-manifold vertices to corresponding UV charts; merging more than one of the plurality of consistent UV charts based on a similarity between the plurality of consistent UV charts and one or more reference charts associated with the one or more previous frames; and generating temporally correlated UV atlases for the current frame based on aligning the plurality of consistent UV charts with the one or more reference charts associated with the one or more previous frames.

20 Claims, 7 Drawing Sheets

(51) Int. Cl.
*G06T 15/04* (2011.01)
*G06T 17/20* (2006.01)

(58) Field of Classification Search
CPC ......... G06T 15/00; G06T 17/30; G06T 19/20; G06T 2207/10016; G06T 11/001; G06T 17/205

See application file for complete search history.

(56) References Cited

U.S. PATENT DOCUMENTS

| | | |
|---|---|---|
| 2018/0101978 A1 | 4/2018 | Hirota |
| 2018/0330480 A1* | 11/2018 | Liu .................. G06T 15/04 |
| 2019/0180495 A1 | 6/2019 | Ceylan et al. |
| 2019/0304161 A1 | 10/2019 | Yin et al. |
| 2020/0219286 A1 | 7/2020 | Sinharoy et al. |
| 2021/0168386 A1 | 6/2021 | Zhang et al. |
| 2021/0211724 A1 | 7/2021 | Kim et al. |

OTHER PUBLICATIONS

J. Vollmer, et al., "Improved Laplacian Smoothing of Noisy Surface Meshes", Eurographics, 1999, pp. 1-8, vol. 18, No. 3.

International Search Report dated Jun. 27, 2023 in Application No. PCT/US2023/015439.

Written Opinion of the International Searching Authority dated Jun. 27, 2023 in Application No. PCT/US2023/015439.

Yamasaki et al., "Patch-Based Compression for Time-Varying Meshes", Proceedings of 2010 IEEE 17th International Conference on Image Processing, Sep. 26-29, 2010, pp. 3433-3436.

Zhang et al., "[V-CG] Tencent's Dynamic Mesh Coding CfP response", International Organisation for Standardisation Organisation Internationale De Normalisation ISO/IEC JTC 1/SC 29/WG 7 Coding of Moving Pictures and Audio, m59295, Apr. 2022, pp. 1-16.

Extended European Search Report issued Jun. 5, 2025 in Application No. 23775481.7.

\* cited by examiner

FIG. 5
500
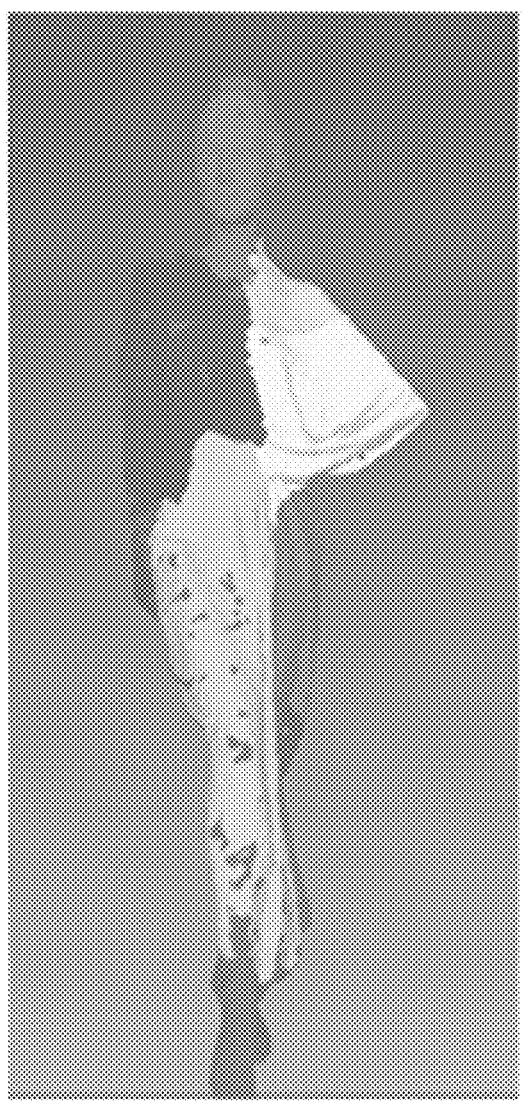 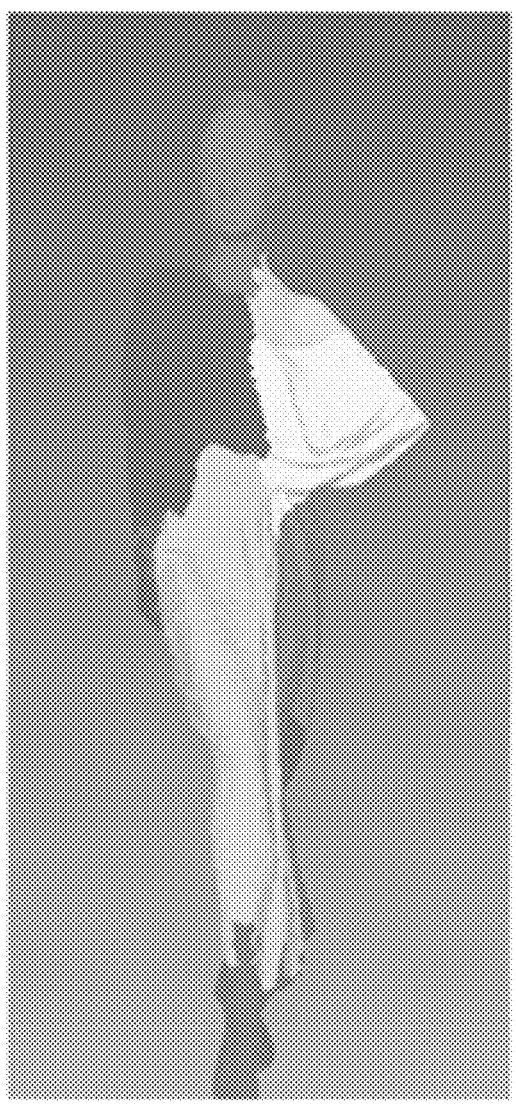

MESH PARAMETERIZATION WITH TEMPORALLY CORRELATED UV ATLASES

CROSS-REFERENCE TO RELATED APPLICATION

This application claims priority from U.S. Provisional Application No. 63/323,885, filed on Mar. 25, 2022, the disclosure of which is incorporated herein by reference in its entirety.

FIELD

This disclosure is directed to a set of advanced video coding technologies. More specifically, the present disclosure is directed to video based dynamic mesh alignment and compression.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may be composed of several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

In addition to the above, many alignment methods, especially the temporal alignment, are based on sequential techniques. In other words, the processing of one frame depends on other frames, such as using the results of chart allocation from a previous frame as the basis for allocating the charts of the current frame. The dependency makes those methods unsuitable for parallelization hence are slow to encode/decode meshes. Therefore, methods eliminating this dependency are needed to enable parallelization and improve encoding and decoding efficiency.

SUMMARY

According to embodiments, a method for generating temporally correlated UV atlases includes generating plurality of consistent UV charts associated with a current frame based on partition information associated with one or more previous frames; removing one or more non-manifold vertices from the plurality of consistent UV charts based on assigning one or more incident faces associated with the one or more non-manifold vertices to corresponding UV charts among the plurality of consistent UV charts; merging more than one of the plurality of consistent UV charts based on a similarity between the plurality of consistent UV charts and one or more reference charts associated with the one or more previous frames; and generating temporally correlated UV atlases for the current frame based on aligning the plurality of consistent UV charts with the one or more reference charts associated with the one or more previous frames, wherein the aligning is based on packing information associated with the one or more reference charts.

According to embodiments, a device for generating temporally correlated UV atlases includes at least one memory configured to store program code; and at least one processor configured to read the program code and operate as instructed by the program code, the program code including: first generating code configured to cause the at least one processor to generate plurality of consistent UV charts associated with a current frame based on partition information associated with one or more previous frames; first removing code configured to cause the at least one processor to remove one or more non-manifold vertices from the plurality of consistent UV charts based on assigning one or more incident faces associated with the one or more non-manifold vertices to corresponding UV charts among the plurality of consistent UV charts; first merging code configured to cause the at least one processor to merge more than one of the plurality of consistent UV charts based on a similarity between the plurality of consistent UV charts and one or more reference charts associated with the one or more previous frames; and second generating code configured to cause the at least one processor to generate temporally correlated UV atlases for the current frame based on aligning the plurality of consistent UV charts with the one or more reference charts associated with the one or more previous frames, wherein the aligning is based on packing information associated with the one or more reference charts.

According to embodiments, a non-transitory computer-readable medium stores instructions, including one or more instructions that, when executed by one or more processors of a device for generating temporally correlated UV atlases, cause the one or more processors to: generate plurality of consistent UV charts associated with a current frame based on partition information associated with one or more previous frames; remove one or more non-manifold vertices from the plurality of consistent UV charts based on assigning one or more incident faces associated with the one or more non-manifold vertices to corresponding UV charts among the plurality of consistent UV charts; merge more than one of the plurality of consistent UV charts based on a similarity between the plurality of consistent UV charts and one or more reference charts associated with the one or more previous frames; and generate temporally correlated UV atlases for the current frame based on aligning the plurality of consistent UV charts with the one or more reference charts associated with the one or more previous frames, wherein the aligning is based on packing information associated with the one or more reference charts.

BRIEF DESCRIPTION OF THE DRAWINGS

Further features, the nature, and various advantages of the disclosed subject matter will be more apparent from the following detailed description and the accompanying drawings in which:

FIG. 5 is an illustration of filling "holes" in charts, in accordance with embodiments of the present disclosure.

DETAILED DESCRIPTION

A mesh may include several polygons that describe the surface of a volumetric object. Its vertices in 3D space and the information of how the vertices are connected may define each polygon, referred to as connectivity information. Optionally, vertex attributes, such as colors, normals, etc., may be associated with the mesh vertices. Attributes may also be associated with the surface of the mesh by exploiting mapping information that parameterizes the mesh with 2D attribute maps. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. Existing standards do not take into account time varying attribute maps and connectivity information. Existing standards also do not support volumetric acquisition techniques that generate a constant connectivity dynamic mesh, especially under real-time conditions.

Therefore, new mesh compression standard to directly handle dynamic meshes with time varying connectivity information and optionally time varying attribute maps is needed. Embodiments of the present disclosure enable efficient compression technologies to store and transmit such dynamic meshes. Embodiments of the present disclosure enable lossy and/or lossless compression for various applications, such as real-time communications, storage, free viewpoint video, AR and VR.

To achieve efficient compression, embodiments of the present disclosure employ spatial and temporal alignments to obtain intra-frame and/or inter-frame correlations. In related art, many of the alignment methods, especially the temporal alignment, are based on sequential techniques. In other words, the processing of one frame depends on other frames, such as using the results of chart allocation from a previous frame as the basis for allocating the charts of the current frame. The dependency makes those methods unsuitable for parallelization hence are slow to encode/decode meshes. Therefore, methods eliminating this dependency are needed to enable parallelization and improve encoding and decoding efficiency.

According to an aspect of the present disclosure, methods, systems, and non-transitory storage mediums for parallel processing of dynamic mesh compression are provided. Embodiments of the present disclosure may also be applied to static meshes.

Figure 1:
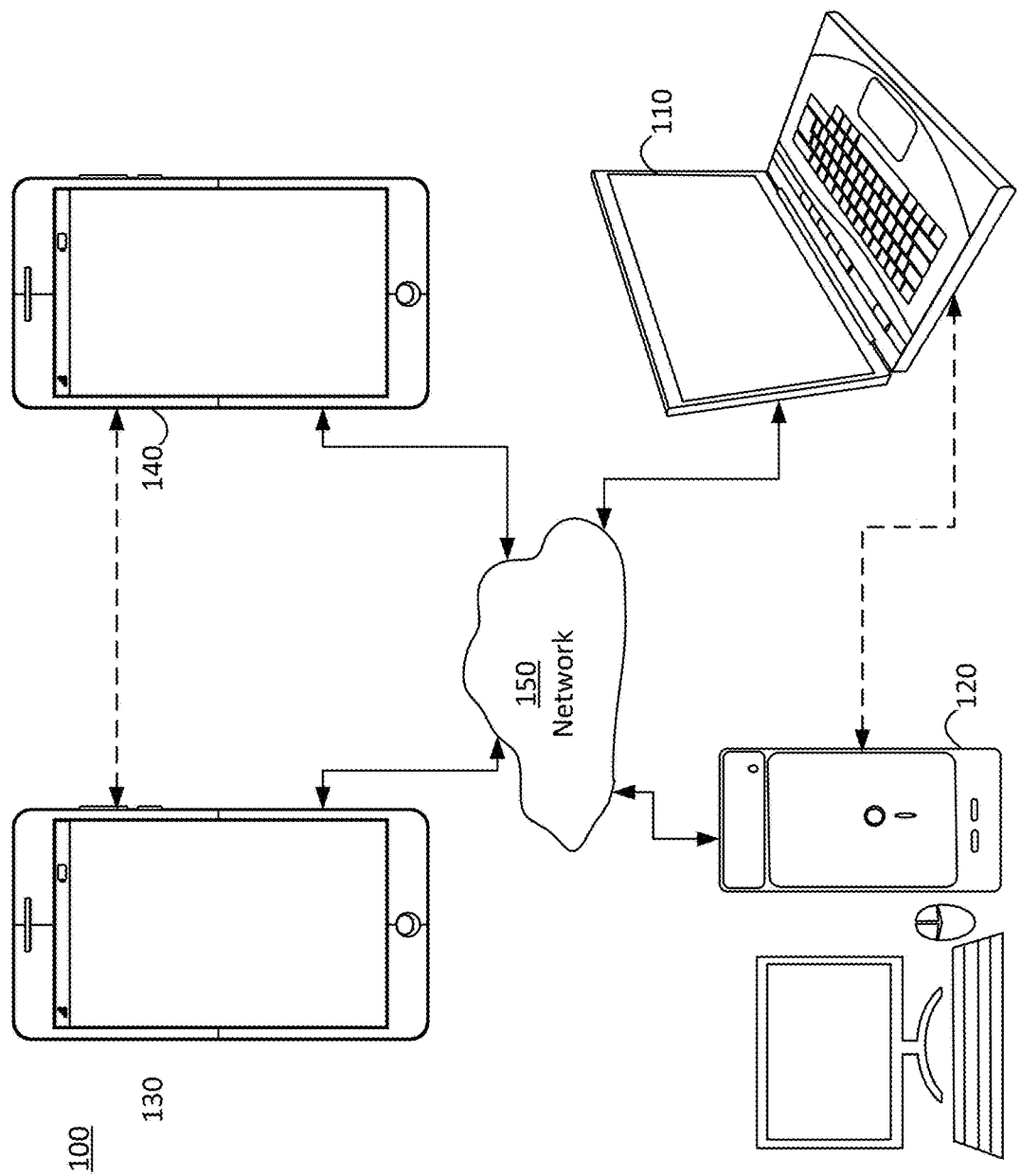
FIG. 1 is a schematic illustration of a simplified block diagram of a communication system, in accordance with embodiments of the present disclosure.
Figure 2:
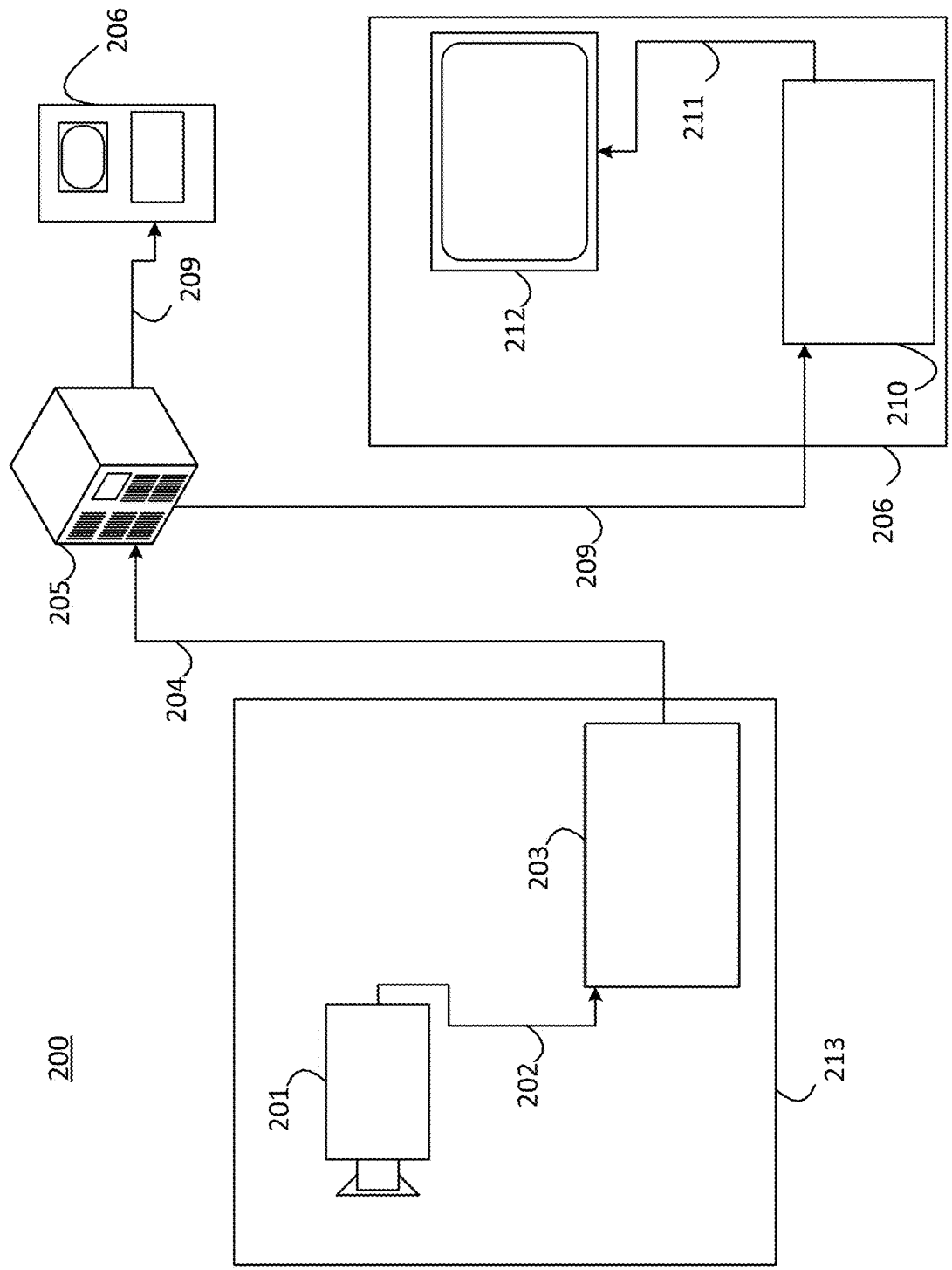
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3:
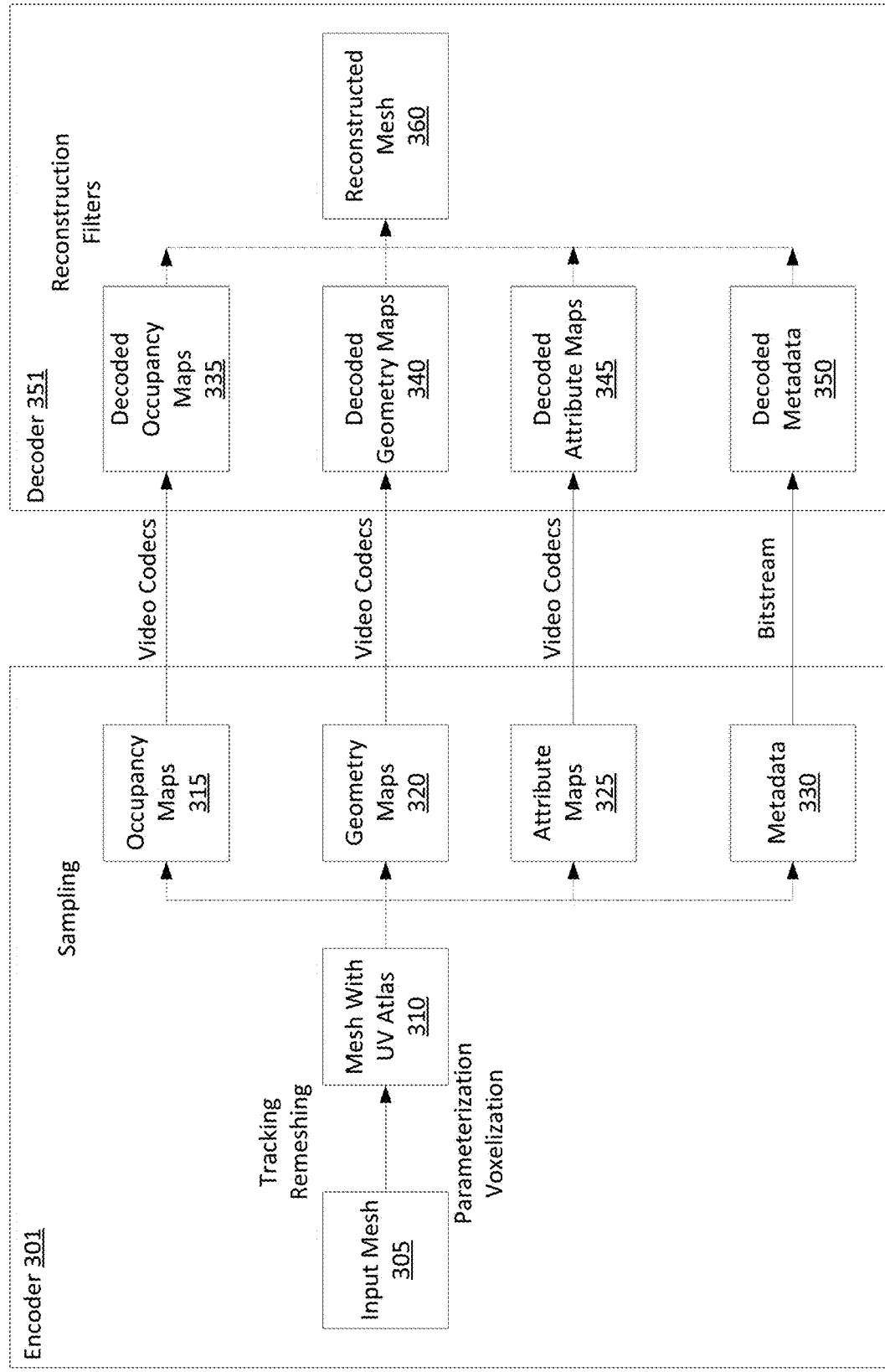
FIG. 3 is a schematic illustration of a simplified block diagram of a video encoder and decoder, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 351 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

The input meshes with 2D UV atlases may have vertices, where each vertex of the mesh may have an associated UV coordinates on the 2D atlas. The occupancy, geometry, and attribute maps may be generated by sampling one or more points/positions on the UV atlas. Each sample position, if it is inside a polygon defined by the mesh vertices, may be occupied or unoccupied. For each occupied sample, one can calculate its corresponding 3D geometry coordinates and attributes by interpolating from the associated polygon vertices.

According to an aspect of the present disclosure, the sampling rate may be consistent over the whole 2D atlas. In some embodiments, the sampling rate for u and v axes may be different, making anisotropic remeshing possible. In some embodiments, the whole 2D atlas may be divided into multiple regions, such as slices or tiles, and each such region may have a different sampling rate.

According to an aspect of the present disclosure, the sampling rate for each region (or the entire 2D atlas) may be signaled in a high-level syntax, including but not limited to sequence header, frame header, slice header, etc. In some embodiments, sampling rate for each region (or the entire 2D atlas) may be chosen from a pre-established set of rates that have been assumed by both the encoder and decoder. Because the pre-established set of rates that are known by both the encoder and decoder, signaling of one particular sampling rate would require only signaling the index in the pre-established rate set. An example of such a pre-established set may be every 2 pixels, every 4 pixels, every 8 pixels, etc. In some embodiments, the sampling rate for each region (or the entire 2D atlas) of a mesh frame may be predicted from a pre-established rate set, from a previously used sampling rate in other already coded regions of the same frame, or from a previously used sampling rate in other already coded mesh frames.

In some embodiments, the sampling rate for each region (or the entire 2D atlas) may be based on some characteristic of each region (or the entire 2D atlas). As an example, the sample rate can be based on activity—for a rich-textured region (or the entire 2D atlas), or a region (or the entire 2D atlas) with high activity, the sample rate could be set higher. As another example, for a smooth region (or the entire 2D atlas), or a region (or the entire 2D atlas with low activity, the sample rate could be set lower.

In some embodiments, the sampling rate for each region (or the entire 2D atlas) of a mesh frame may be signaled in a way that combination of prediction and direct signaling may be allowed. The syntax may be structured to indicate if a sampling rate will be predicted or directly signaled. When predicted, which of the predictor-sampling rate to be used may be further signaled. When directly signaled, the syntax to represent the value of the rate may be signaled.

Figure 4:
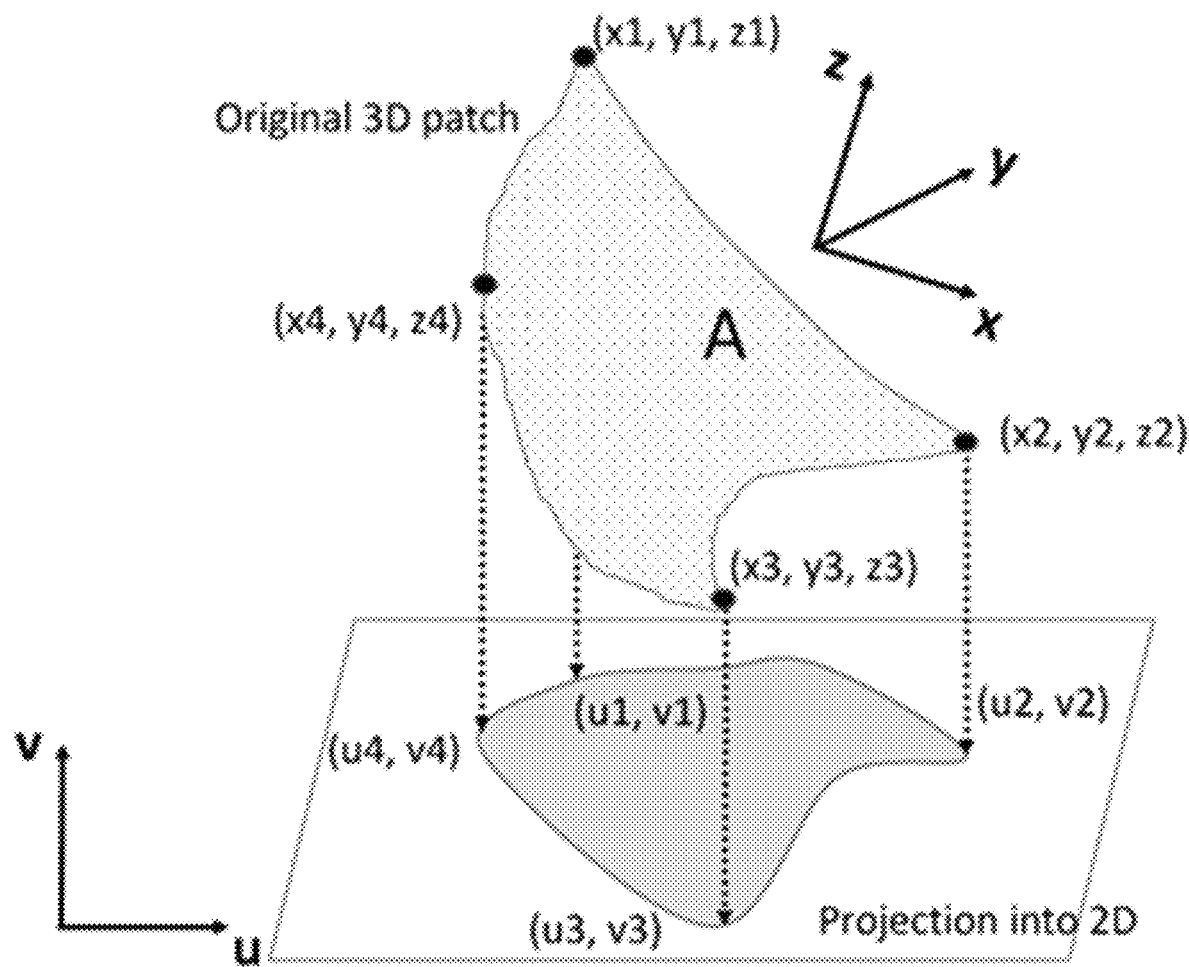
FIG. 4 is an exemplary illustration of projecting a 3D chart onto a 2D UV plane, in accordance with embodiments of the present disclosure.

FIG. 4 is an exemplary diagram 400 illustrating projecting a 3D chart onto a 2D UV plane (2D UV chart), in accordance with embodiments of the present disclosure.

As seen in FIG. 4, a 3D mesh may be split into several charts, each of which may be projected on to a 2D plane. On the 2D UV plane, the attribute information of the mesh, such as texture information, can find it correspondence to the 3D vertices.

As seen in FIG. 4, the UV coordinate information may be used to find the texture information of a 3D location (such as a vertex) on the 2D UV plane. In embodiments, the partitioning process of charts may not be the same, resulting various shapes of charts and allocations on the 2D planes across different mesh frames.

As stated above, a dynamic mesh sequence may require a large amount of data since it may consist of a significant amount of information changing over time. In particular, if the correlation between the UV atlases of different mesh frames is low, the compression of texture maps or geometry images may be inefficient. Therefore, highly correlated UV atlases across different mesh frames are desired for dynamic mesh compression.

Embodiments of the present disclosure are directed to generating temporally correlated UV atlases for dynamic mesh compression. Embodiments may be applied individually or by any form of combinations.

The framework of creating mesh UV atlases may include 5 steps—mesh preprocessing, partition, parameterization, merging and packing.

According to embodiments, mesh pre-processing may be required to satisfy the input requirements for mesh parameterization algorithms. In embodiments, the meshes may be first cleaned by removing duplicated, isolated, or degenerated faces or vertices. Then, depending on the smoothness of the meshes, smoothing filters may be applied to the cleaned meshes such that the number of produced UV charts will be reduced. In some embodiments, the connectivity of the meshes is invariant under the smoothing operation.

According to embodiments, to generate highly correlated UV atlases, consistent UV charts may be generated first. Consistent UV charts may include charts where some of the charts in the current frames are similar to the ones in the previous frame in terms of 3D location, shape, size etc. Consistent UV charts may be obtained by using the partition information from the previous frames.

In one embodiments, representative vertices employed in the previous frame for mesh partitioning may be used as the reference vertices. The representative vertices for partitioning in the current frame may be chosen from the landmark vertices that are closest to those reference vertices. Since the partitioning may be based on the geodesic distance between the faces and representative vertices, similar representative vertices will result in similar partitioning, and therefore, consistent charts.

In another embodiment, some of charts in the previous frames may be used as the reference charts for partitioning in the current frame. For example, the reference charts may be chosen based on the largest charts in terms of number of vertices, number of faces or chart areas in 2D or 3D etc. After the reference charts in the previous frame are determined, their information may be used to find the corresponding charts in the current frame. For example, the centroid of each face in a reference chart can be utilized to find the closest face in the current frame, which will be a face in the corresponding chart.

In some embodiments, charts generated may be validated. In one example, the corresponding charts obtained from the reference charts may not be manifolds or simply connected (by the standard definitions), so therefore, non-manifold vertices may need to be removed and/or "holes" in the charts may need to be filled. Non-manifold vertices may be detected and removed by assigning all the incident faces to the corresponding charts. To detect the "holes" in a chart, the Euler characteristic of the chart may be computed.

$$X \triangleq k_0 - k_1 + k_2, \qquad \text{Eqn (1)}$$

where $k_0$, $k_1$, $k_2$ are the number of vertices, edges and faces in the chart, and $x=b_0-b_1$, where $b_0$ is the number of connected components and $b_1$ is the number of "holes" that are enclosed by interior boundary loops. Thus, for a single chart, $b_0=1$, so the number "holes" in the chart may be calculated as:

$$b_1 = b_0 - x = 1 - k_0 + k_1 - k_2. \qquad \text{Eqn (2)}$$

In some embodiments, the "holes" may be detected by finding all the interior boundary loops in the chart. After detecting "holes", the "holes" may be filled by either assigning the connected components in the "holes" to the corresponding charts or iteratively relabeling the faces incident to the interior boundaries as parts of the corresponding charts.

As an example, FIG. 5 illustrates a filling of "holes" in charts, in accordance with embodiments of the present disclosure. In FIG. 5, the left and right panels show the charts before and after filling "holes", respectively After validating the topology of the corresponding charts, whether the corresponding charts don't grow too large by the face reassignment operations described above may need to be verified. As an example, whether the chart areas or the number of faces in the validated charts significantly differ from the reference charts may be determined. If so, the charts as the ones inferred from reference charts may be dropped.

In come embodiments, the charts may have to be merged. It is desirable to keep the similarity between the reference charts in the previous frame and the corresponding charts in the current frame during merging. Thus, some restrictions are needed for merging charts lest the similarity be ruined by merging. As one non-limiting example, specific policies may be adopted to merge charts. As an initial matter, a unique merging ID may be assigned for each corresponding charts inferred from the reference charts. An exception may be if the reference charts are merged in the previous frame, then the corresponding charts may have the same merging ID as they may also be allowed to merge. All other charts that are not inferred from reference charts may have the same merging ID that is different from the corresponding charts. In some embodiments, all the descendant charts may inherit the same merging ID as their ancestor charts. Then, only charts with the same merging ID may merge. An exception to requiring the same merging ID may be made when merging a large corresponding chart and a small chart which does not change the corresponding chart much in terms of, for example, number of faces or chart areas. Then, they may be allowed to merge regardless the merging ID.

A final step for generating UV mesh atlases may be packing charts. In some embodiments, the reference charts from the previous frame and the corresponding charts in the current frame may be aligned. Firstly, the corresponding charts may be packed by using the packing information of the reference charts, such as the locations, orientation etc. After that, the charts that are not inferred from reference charts may be packed.

Figure 6:
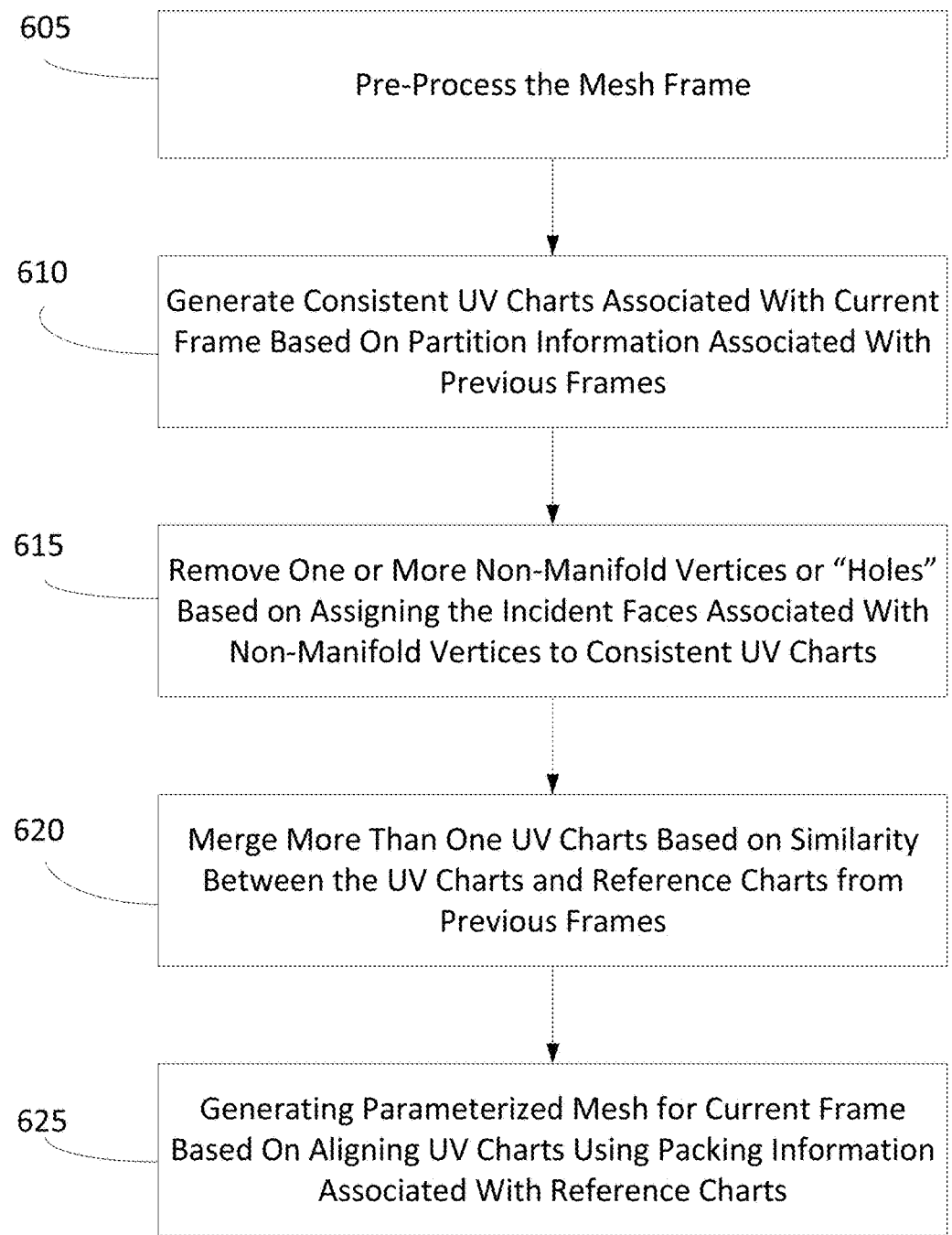
FIG. 6 is an exemplary flow diagram illustrating a process for generating temporally correlated UV atlases, in accordance with embodiments of the present disclosure.

FIG. 6 is a flow diagram illustrating a process 600 for generating temporally correlated UV atlases, in accordance with embodiments of the present disclosure.

At operation 605, the current frame may be pre-processed by removing duplicated, isolated, or degenerated faces or vertices.

In some embodiments, after the pre-processing, depending on the smoothness of the meshes, smoothing filters can be optionally applied to the cleaned meshes such that the number of produced UV charts will be reduced.

At operation 610, one or more consistent UV charts associated with a current frame based on partition information associated with one or more previous frames may be generated.

In some embodiments, the partition information may include at least one of reference vertices from the one or more previous frames and reference charts from the one or more previous frames. In some embodiments, the representative vertices for partitioning the current frame may be selected from among landmark vertices in the current frame that are geodesically close to the reference vertices from the one or more previous frames. In some embodiments, the representative charts for partitioning the current frame may be selected from among the reference charts associated with the one or more previous frames, and wherein the selection may be based on at least one of a number of vertices in the reference charts, a number of faces in the reference charts, or a number of chart areas in the reference charts.

At operation 615, one or more non-manifold vertices from the one or more consistent UV charts may be removed based on assigning one or more incident faces associated with the one or more non-manifold vertices to corresponding UV charts among the one or more consistent UV charts.

At operation 620, more than one of the one or more consistent UV charts may be merged based on a similarity between the one or more consistent UV charts and one or more reference charts associated with the one or more previous frames.

In some embodiments, the merging may include assigning a merging ID for each UV chart associated with the current frame inferred from the one or more reference charts, wherein based a reference chart among the one or more reference charts being merged in the one or more previous frames, a same merging ID may be assigned to a merging of UV charts among the one or more consistent UV charts associated with the current frame. In some embodiments, the merging may include merging more than one of the one or more consistent UV charts having the same merging ID.

In some embodiments, the merging may include merging a large UV chart among the one or more consistent UV charts and a small UV chart among the one or more consistent UV charts, wherein merging the large UV chart and the small UV chart may not change a number of faces of the merged UV chart and wherein the large UV chart may have a different merging ID than the small UV chart.

At operation 625, temporally correlated UV atlases for the current frame may be generated based on aligning the one or more consistent UV charts with the one or more reference charts associated with the one or more previous frames, wherein the aligning is based on packing information associated with the one or more reference charts.

The techniques, described above, can be implemented as computer software using computer-readable instructions and physically stored in one or more computer-readable media. For example, FIG. 7 shows a computer system 700 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
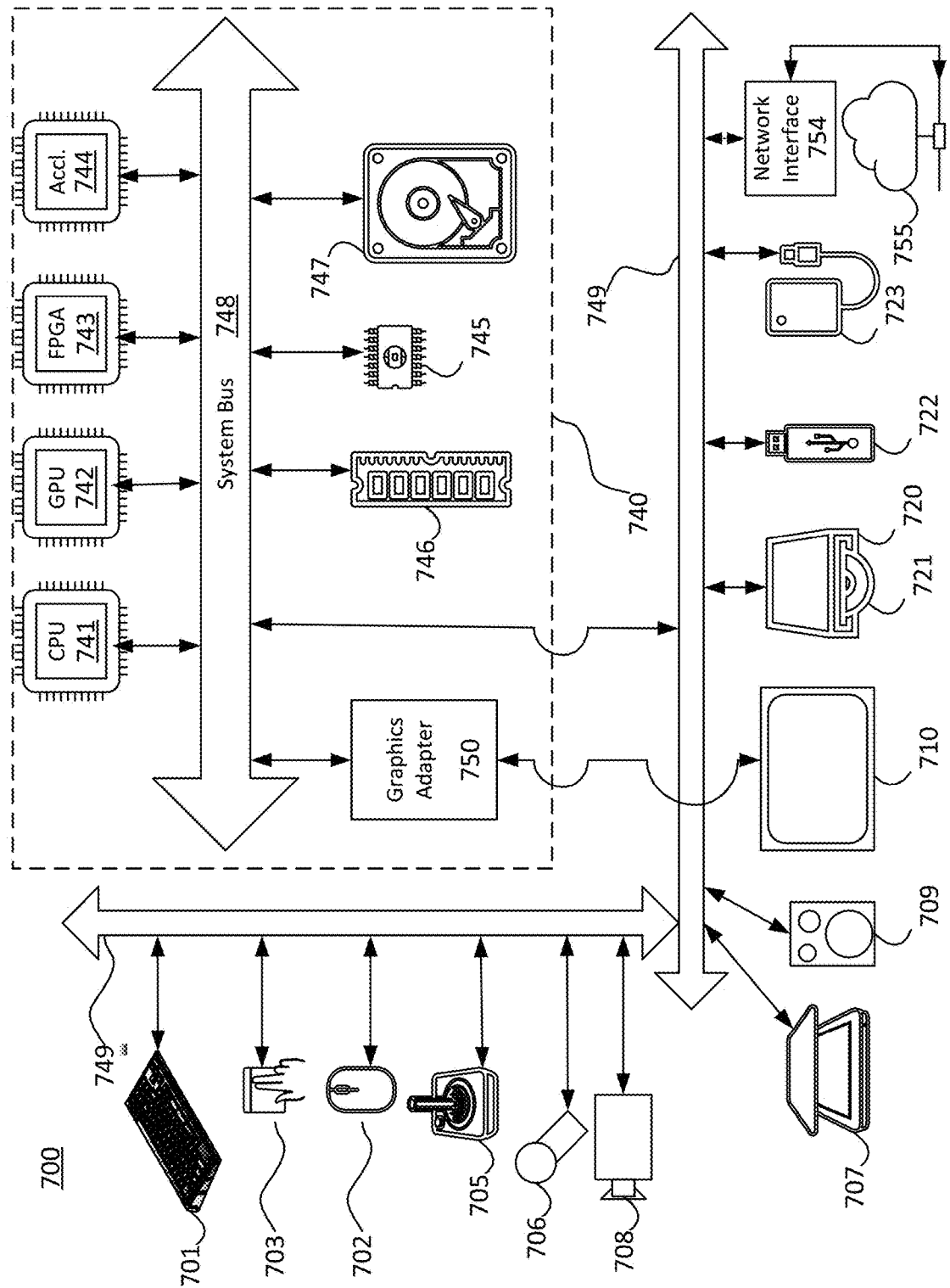
FIG. 7 is a diagram of a computer system suitable for implementing embodiments.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there can also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted), and printers (not depicted)).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth.

Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 755. Certain protocols and protocol stacks can be used on each of those networks and network interfaces as described above.

Aforementioned human interface devices, human-accessible storage devices, and network interfaces 754 can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, a computer system having an architecture corresponding to computer system 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for generating temporally correlated UV atlases, the method being executed by at least one processor, the method comprising:
    generating a plurality of consistent UV charts associated with a current frame based on partition information associated with one or more previous frames;
    removing one or more non-manifold vertices from the plurality of consistent UV charts based on assigning one or more incident faces associated with the one or more non-manifold vertices to corresponding UV charts among the plurality of consistent UV charts;
    merging more than one of the plurality of consistent UV charts based on a similarity between the plurality of consistent UV charts and one or more reference charts associated with the one or more previous frames; and
    generating temporally correlated UV atlases for the current frame based on aligning the plurality of consistent UV charts with the one or more reference charts associated with the one or more previous frames, wherein the aligning is based on packing information associated with the one or more reference charts.

2. The method of claim 1, wherein the partition information comprises at least one of reference vertices from the one or more previous frames and reference charts from the one or more previous frames.

3. The method of claim 2, wherein representative vertices for partitioning the current frame are selected from among landmark vertices in the current frame that are geodesically close to the reference vertices from the one or more previous frames.

4. The method of claim 2, wherein representative charts for partitioning the current frame are selected from among the reference charts associated with the one or more previous frames, and wherein the selection is based on at least one of a number of vertices in the reference charts, a number of faces in the reference charts, or a number of chart areas in the reference charts.

5. The method of claim 1, wherein the merging comprises:
assigning a merging ID for each UV chart associated with the current frame inferred from the one or more reference charts, wherein:
based a reference chart among the one or more reference charts being merged in the one or more previous frames, a same merging ID is assigned to a merging of UV charts among the plurality of consistent UV charts associated with the current frame.

6. The method of claim 5, wherein the merging further comprises merging more than one of the plurality of consistent UV charts having the same merging ID.

7. The method of claim 6, wherein the merging further comprises merging a large UV chart among the plurality of consistent UV charts and a small UV chart among the plurality of consistent UV charts, wherein merging the large UV chart and the small UV chart does not change a number of faces of the merged UV chart and wherein the large UV chart has a different merging ID than the small UV chart.

8. A device for generating temporally correlated UV atlases, the device comprising:
at least one memory configured to store program code; and
at least one processor configured to read the program code and operate as instructed by the program code, the program code including:
first generating code configured to cause the at least one processor to generate plurality of consistent UV charts associated with a current frame based on partition information associated with one or more previous frames;
first removing code configured to cause the at least one processor to remove one or more non-manifold vertices from the plurality of consistent UV charts based on assigning one or more incident faces associated with the one or more non-manifold vertices to corresponding UV charts among the plurality of consistent UV charts;
first merging code configured to cause the at least one processor to merge more than one of the plurality of consistent UV charts based on a similarity between the plurality of consistent UV charts and one or more reference charts associated with the one or more previous frames; and
second generating code configured to cause the at least one processor to generate temporally correlated UV atlases for the current frame based on aligning the plurality of consistent UV charts with the one or more reference charts associated with the one or more previous frames, wherein the aligning is based on packing information associated with the one or more reference charts.

9. The device of claim 8, wherein the partition information comprises at least one of reference vertices from the one or more previous frames and reference charts from the one or more previous frames.

10. The device of claim 9, wherein representative vertices for partitioning the current frame are selected from among landmark vertices in the current frame that are geodesically close to the reference vertices from the one or more previous frames.

11. The device of claim 9, wherein representative charts for partitioning the current frame are selected from among the reference charts associated with the one or more previous frames, and wherein the selection is based on at least one of a number of vertices in the reference charts, a number of faces in the reference charts, or a number of chart areas in the reference charts.

12. The device of claim 8, wherein the first merging code comprises:
assigning a merging ID for each UV chart associated with the current frame inferred from the one or more reference charts, wherein:
based a reference chart among the one or more reference charts being merged in the one or more previous frames, a same merging ID is assigned to a merging of UV charts among the plurality of consistent UV charts associated with the current frame.

13. The device of claim 12, wherein the first merging code further comprises merging more than one of the plurality of consistent UV charts having the same merging ID.

14. The device of claim 13, wherein the first merging code further comprises merging a large UV chart among the plurality of consistent UV charts and a small UV chart among the plurality of consistent UV charts, wherein merging the large UV chart and the small UV chart does not change a number of faces of the merged UV chart and wherein the large UV chart has a different merging ID than the small UV chart.

15. A non-transitory computer-readable medium storing instructions, the instructions comprising: one or more instructions that, when executed by one or more processors of a device for generating temporally correlated UV atlases, cause the one or more processors to:
generate plurality of consistent UV charts associated with a current frame based on partition information associated with one or more previous frames;
remove one or more non-manifold vertices from the plurality of consistent UV charts based on assigning one or more incident faces associated with the one or more non-manifold vertices to corresponding UV charts among the plurality of consistent UV charts;
merge more than one of the plurality of consistent UV charts based on a similarity between the plurality of consistent UV charts and one or more reference charts associated with the one or more previous frames; and
generate temporally correlated UV atlases for the current frame based on aligning the plurality of consistent UV charts with the one or more reference charts associated with the one or more previous frames, wherein the aligning is based on packing information associated with the one or more reference charts.

16. The non-transitory computer-readable medium of claim 15, wherein the partition information comprises at least one of reference vertices from the one or more previous frames and reference charts from the one or more previous frames.

17. The non-transitory computer-readable medium of claim 16, wherein representative vertices for partitioning the current frame are selected from among landmark vertices in the current frame that are geodesically close to the reference vertices from the one or more previous frames.

18. The non-transitory computer-readable medium of claim 16, wherein representative charts for partitioning the current frame are selected from among the reference charts associated with the one or more previous frames, and wherein the selection is based on at least one of a number of vertices in the reference charts, a number of faces in the reference charts, or a number of chart areas in the reference charts.

19. The non-transitory computer-readable medium of claim 18, wherein the merging comprises:

assigning a merging ID for each UV chart associated with the current frame inferred from the one or more reference charts, wherein:
   based a reference chart among the one or more reference charts being merged in the one or more previous frames, a same merging ID is assigned to a merging of UV charts among the plurality of consistent UV charts associated with the current frame.

20. The non-transitory computer-readable medium of claim 16, wherein the merging further comprises merging more than one of the plurality of consistent UV charts having the same merging ID.

\* \* \* \* \*